US010550300B2

United States Patent
Ema et al.

(10) Patent No.: US 10,550,300 B2
(45) Date of Patent: *Feb. 4, 2020

(54) METHOD FOR PRODUCING PURIFIED ACTIVE SILICIC ACID SOLUTION AND SILICA SOL

(71) Applicant: NISSAN CHEMICAL INDUSTRIES, LTD., Tokyo (JP)

(72) Inventors: Kiyomi Ema, Tokyo (JP); Noriyuki Takakuma, Sodegaura (JP); Tohru Nishimura, Toyama (JP); Naoki Kawashita, Toyama (JP); Kouji Yamaguchi, Toyama (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,571

(22) Filed: Jul. 8, 2016

(65) Prior Publication Data
US 2016/0319173 A1  Nov. 3, 2016

Related U.S. Application Data

(63) Continuation of application No. 13/617,453, filed on Sep. 14, 2012, now Pat. No. 10,400,147.

(60) Provisional application No. 61/676,619, filed on Jul. 27, 2012.

(30) Foreign Application Priority Data

Sep. 16, 2011 (JP) ................. 2011-203170

(51) Int. Cl.
| C09K 3/14 | (2006.01) |
| C09K 13/04 | (2006.01) |
| C01B 33/143 | (2006.01) |
| C01B 33/148 | (2006.01) |
| C01B 33/141 | (2006.01) |

(52) U.S. Cl.
CPC ........ C09K 3/1463 (2013.01); C01B 33/1412 (2013.01); C01B 33/1435 (2013.01); C01B 33/1485 (2013.01); C09K 13/04 (2013.01)

(58) Field of Classification Search
CPC . B24D 3/00; B24D 11/00; B24D 3/02; B24D 18/00; C09K 3/1463; C09K 13/04; C01B 33/1412; C01B 33/1435; C01B 33/1485
See application file for complete search history.

(56) References Cited

U.S. PATENT DOCUMENTS

| 5,100,581 A | 3/1992 | Watanabe et al. |
| 2010/0146864 A1 | 6/2010 | Nakayama et al. |
| 2011/0210059 A1 | 9/2011 | Green et al. |

FOREIGN PATENT DOCUMENTS

| CN | 101077946 A | 11/2007 |
| EP | 2 754 640 A1 | 7/2014 |
| JP | 61-158810 A | 7/1986 |
| JP | 2001-294417 A | 10/2001 |
| JP | 2001-294420 A | 10/2001 |
| JP | 2006-136996 A | 6/2006 |
| WO | 99/052821 A2 | 10/1999 |

OTHER PUBLICATIONS

Machine Translation of CN 101077946 provided by Google.*
Oct. 17, 2016 Office Action issued in U.S. Appl. No. 13/617,453.
Apr. 23, 2015 Office Action issued in Chinese Application No. 201280038840.6.
May 6, 2015 extended European Search Report issued in European Application No. 12831701.3.
Feb. 1, 2016 Office Action issued in U.S. Appl. No. 13/617,453.
Mar. 24, 2017 extended European Search Report issued in European Application No. 16204020.8.
Apr. 7, 2017 Office Action issued in U.S. Appl. No. 13/617,453.
Jan. 26, 2018 Office Action Issued in U.S. Appl. No. 13/617,453.
Aug. 16, 2018 Office Action issued in U.S. Appl. No. 13/617,453.

* cited by examiner

*Primary Examiner* — James A Fiorito
(74) *Attorney, Agent, or Firm* — Oliff PLC

(57) ABSTRACT

A method for producing an active silicic acid solution in which the existing amount of foreign matters as plate-like fine particles is reduced and a method for producing a silica sol in which such foreign matters are reduced. The method fulfills the following condition; the existing amount of plate-like fine particles having a length of one side of 0.2 to 4.0 μm and a thickness of 1 to 100 nm is measured to be 0% to 30% in accordance with measuring method A, the method including the steps of: preparing an active silicic acid solution by subjecting an alkali silicate aqueous solution having a silica concentration of 0.5% by mass to 10.0% by mass to cation-exchange to remove alkaline components; and filtering the active silicic acid solution through a filter whose removal rate of particles having a primary particle size of 1.0 μm is 50% or more.

13 Claims, No Drawings

METHOD FOR PRODUCING PURIFIED ACTIVE SILICIC ACID SOLUTION AND SILICA SOL

CROSS-REFERENCE TO RELATED APPLICATIONS

This is a Continuation of application Ser. No. 13/617,453 filed Sep. 14, 2012, which in turn claims the benefit of U.S. Provisional Application No. 61/676,619 filed Jul. 27, 2012, and claims the benefit of JP 2011-203170 filed Sep. 16, 2011. The disclosure of the prior applications is hereby incorporated by reference herein in its entirety.

TECHNICAL FIELD

The present invention relates to a method for producing an active silicic acid solution in which the existing amount of foreign matters as plate-like fine particles is reduced, and relates to a method for producing a silica sol using the active silicic acid solution in which such foreign matters are reduced.

BACKGROUND ART

In recent years, in order to increase the recording density of a memory magnetic disk, the surfacing thickness of the magnetic head has become extremely small such as 10 nm or less. For the production process of the magnetic disk substrate, a surface polishing process is essential and the surface polishing is performed with a polishing agent containing colloidal silica, or the like.

For the polishing agent, there is required, besides having advantageous surface smoothing properties (for example, surface roughness [Ra] and waviness [wa]), not causing a surface defect such as scratching and pitting.

An alkali silicate aqueous solution becoming a raw material for a silica sol used as a raw material for the polishing agent has conventionally been purified by a method including: adding a filtering assistant such as a diatomaceous earth to a crude alkali silicate aqueous solution immediately after being prepared by heating-dissolving a raw material cullet in the alkali silicate aqueous solution; and filtering the alkali silicate aqueous solution. As a method for obtaining an alkali silicate aqueous solution in which a particle having a size of 1 nm or more does not substantially exist, there is disclosed a method including: adjusting the viscosity of an alkali silicate aqueous solution to 1 mPa·s to 50 mPa·s beforehand; and passing the alkali silicate aqueous solution through a ultrafiltration membrane having a cutoff molecular weight of 15,000 or less (Patent Document 1).

Also in the semiconductor field, reduction in the size of wiring has been progressed in association with high integration of the circuit and speeding up of the operating frequency. In the production process of a semiconductor device also, further smoothing of the pattern forming face is desired.

In the planarizing process of the magnetic disk substrate or the semiconductor substrate, following a polishing process with a polishing agent containing colloidal silica, the removal of colloidal silica which is an abrasive grain and fine particles is performed by washing.

For washing, an aqueous solution of an acidic or alkaline chemical is used. Examples of the acidic chemical include: a fluorine ion-containing compound such as hydrofluoric acid, ammonium fluoride, ammonium hydrogen difluoride, and fluoroboric acid; sulfuric acid; nitric acid; hydrochloric acid; acetic acid; citric acid; malic acid; oxalic acid; and perchloric acid. Examples of the alkaline chemical include sodium hydroxide, potassium hydroxide, calcium hydroxide, ammonia, and amines. In addition, to such an acidic or alkaline chemical, a surfactant such as sodium alkylbenzenesulfonate, polyoxyethylene alkyl ether sulfate, and dioctylsulfosuccinate or a chelating agent such as sodium tripolyphosphate, sodium pyrophosphate, zeolite, and sodium ethylenediaminetetraacetate may be added as a component.

The colloidal silica used for the above polishing agent is in a spherical shape or a substantially spherical shape, so that such a colloidal silica can be removed by a conventional washing method. However, recently, it has become apparent that there exists a plate-like fine particle which cannot be easily removed by a conventional washing method.

RELATED-ART DOCUMENT

Patent Document

Patent Document 1: Japanese Patent Application Publication No. 2001-294420 (JP 2001-294420 A)

SUMMARY OF THE INVENTION

Problem to be Solved by the Invention

The inventor of the present invention has confirmed by observation under a scanning electron microscope that the plate-like fine particle is a plate-like particle having a length of one side of 0.2 µm to 4.0 µm and a thickness of 1 nm to 100 nm, and the plate-like fine particle is considered to be derived from a silica sol used as a raw material for the polishing agent.

The method described in Patent Document 1 for preventing a particle having a size of 1 nm or more from existing by the ultrafiltration has an extremely small filtering rate, so that the method is unsuitable for the mass production.

It is an object of the present invention to provide a method for producing a silica sol in which the existing amount of such plate-like fine particles having a length of one side of 0.2 to 4.0 µm and a thickness of 1 to 100 nm is reduced. For this object, it is a task of the present invention to provide a method for reducing the existing amount of plate-like fine particles contained in an active silicic acid solution obtained by subjecting an alkali silicate aqueous solution becoming a raw material for a silica sol to cation-exchange to remove alkaline components, particularly a method suitable for the mass production.

Means for Solving the Problem

As a result of assiduous research intended to overcome these disadvantages, the inventors of the present invention have found a method for solving the task, by filtering an active silicic acid solution obtained by subjecting an alkali silicate aqueous solution to cation-exchange to remove alkaline components, under specific conditions That is, the present invention is, according to a first aspect, a method for producing a purified active silicic acid solution fulfilling the condition (1):
(1) an existing amount of plate-like fine particles having a length of one side of 0.2 to 4.0 µm and a thickness of 1 to 100 nm is measured to be 0% to 30% in accordance with measuring method A, the method characterized by including the steps of:

preparing an active silicic acid solution by subjecting an alkali silicate aqueous solution having a silica concentration of 0.5% by mass to 10.0% by mass to cation-exchange to remove alkaline components; and filtering the active silicic acid solution through a filter whose removal rate of particles having a primary particle size of 1.0 μm is 50% or more, measuring method A: when a membrane-type filter (filtration area: 4.90 cm$^2$) having an absolute pore size of 0.4 μm through which 30 mL of a solution to be observed having a silica concentration of 4% by mass and a temperature of 25° C. is passed, is observed under a scanning electron microscope by being magnified by 5,000 times, a state in which one or more of the plate-like fine particles exist within one visual field as an observation area of a rectangle having a length of 15 μm and a width of 20 μm is measured as one count, and the presence or absence of the count is determined with respect to all of 100 visual fields having visual field areas that do not overlap with each other to measure the obtained total number of counts as the existing amount (%) of the plate-like fine particles;

according to a second aspect, the method for producing a purified active silicic acid solution according to the first aspect, in which the removal rate is 60% or more;

according to a third aspect, the method for producing a purified active silicic acid solution according to the first aspect, in which the removal rate is 70% or more;

according to a fourth aspect, the method for producing a purified active silicic acid solution according to the first aspect, in which the removal rate is 80% or more;

according to a fifth aspect, the method for producing a purified active silicic acid solution according to the first aspect, in which the removal rate is 90% or more;

according to a sixth aspect, the method for producing a purified active silicic acid solution according to any one of the first aspect to the fifth aspect, in which the filter is at least one type selected from the group consisting of a membrane-type filter, a pleats-type filter, a depth-type filter, a yarn-wound filter, a surface-type filter, a roll-type filter, a depth-pleats-type filter, and a diatomaceous-earth-containing-type filter;

according to a seventh aspect, the method for producing a purified active silicic acid solution according to any one of the first aspect to the fifth aspect, in which the filter is a membrane-type filter having an absolute pore size of 0.3 μm to 3.0 μm;

according to an eighth aspect, the method for producing a purified active silicic acid solution according to any one of the first aspect to the seventh aspect, in which the alkaline components of the alkali silicate aqueous solution are at least one type selected from the group consisting of a sodium ion, a potassium ion, a lithium ion, a rubidium ion, and a cesium ion;

according to a ninth aspect, a method for producing a silica sol fulfilling the condition (2):

(2) an existing amount of plate-like fine particles having a length of one side of 0.2 to 4.0 μm and a thickness of 1 to 100 nm is measured to be 0% to 30% in accordance with the measuring method A described in the first aspect, the method characterized by including the steps of:

adding the purified active silicic acid solution described in any one of the first aspect to the eighth aspect into an alkaline aqueous solution to obtain a mixture; and heating the mixture to polymerize active silicic acid; and according to a tenth aspect, the method for producing a silica sol according to the ninth aspect, in which the alkaline components of the alkaline aqueous solution are at least one type selected from the group consisting of an alkali metal ion, an ammonium ion, amine, and a quaternary ammonium ion.

Effects of the Invention

By a conventional method by adding a filtering assistant and purifying by the filtration, there is the problem that plate-like fine particles having a length of one side of 0.2 to 4.0 μm and a thickness of 1 to 100 nm cannot be reduced and even when an active silicic acid solution obtained by passing through a cation-exchange resin is used, the particle cannot be satisfactorily reduced. The method of the present invention solves this problem.

That is, the method for producing an active silicic acid solution of the present invention can efficiently remove the plate-like fine particles having a length of one side of 0.2 to 4.0 μm and a thickness of 1 to 100 nm remaining by a conventionally performed method of filtering the alkali silicate aqueous solution and passing the alkali silicate aqueous solution through a cation-exchange resin. Therefore, in the silica sol produced by using the active silicic acid solution obtained by the present invention, the particle is reduced more than in a conventional silica sol.

Further, when a polishing agent using the silica sol in which the existing amount of the plate-like particle is reduced as described above is applied to a planarizing process of the magnetic disk substrate or the semiconductor substrate, the above particle does not remain or hardly remains on these substrates after the washing process.

Embodiments of the Invention

By the method of the present invention, not only effectively removed is the plate-like particle, but also effectively removed is a particle having a shape similar to the plate shape, for example, a plate-like particle in which the periphery has no straight side (a plate-like particle in which the periphery takes roundness) and a plate-like particle in which a protruding portion is formed in a part of the particle surface.

The particles effectively removed by the present invention are plate-like fine particles having a length of one side of 0.2 to 4.0 μm and a thickness of 1 to 100 nm.

Although as the alkali silicate aqueous solution used for the present invention, the molar ratio $SiO_2/M_2O$ (M is an alkali metal element) thereof is not limited and a commercially available alkali silicate aqueous solution can be used, the molar ratio $SiO_2/M_2O$ thereof is generally 2 to 4.

The alkaline components of the alkali silicate aqueous solution are each an alkali metal ion which is at least one type selected from the group consisting of a sodium ion, a potassium ion, a lithium ion, a rubidium ion, and a cesium ion. Among them, an alkali silicate aqueous solution of a sodium ion, a potassium ion, or a lithium ion is commercially available and can be inexpensively obtained. A sodium silicate aqueous solution is used the most frequently and can be preferably used. The silica concentration of the commercially available sodium silicate aqueous solution is 19% by mass to 38% by mass.

In the method for producing an active silicic acid solution in which an existing amount of plate-like fine particles having a length of one side of 0.2 to 4.0 μm and a thickness of 1 to 100 nm is measured to be 0% to 30% in accordance with the measuring method A according to the present invention, first, the alkali silicate aqueous solution is adjusted to a silica concentration of 0.5% by mass to 10.0% by mass using water. Next, the concentration-adjusted alkali silicate aqueous solution is subjected to cation-exchange to remove alkaline components to prepare an active silicic acid solution and then, the active silicic acid solution is filtered through a filter whose removal rate of particles having a primary particle size of 1.0 μm is 50% or more. Here, the active silicic acid solution refers to an aqueous solution in which silicic acid and a polymer of silicic acid having a particle size of less than 3 nm coexist with each other.

As the method for subjecting the alkali silicate aqueous solution to cation-exchange to obtain the active silicic acid solution, a conventional general method can be adopted. For example, there can be adopted a method in which a hydrogen-type cation-exchange resin (for example, Amberlite (registered trade mark) 120B; manufactured by The Dow Chemical Company) is charged into an alkali silicate aqueous solution having a silica concentration of 0.5% by mass to 10.0% by mass, preferably 2.0% by mass to 5.0% by mass and when pH of the aqueous solution becomes that of an acid, preferably 2 to 4, the cation-exchange resin is separated, and a method in which a column is filled with a hydrogen-type cation-exchange resin and an alkali silicate aqueous solution having a silica concentration of 0.5% by mass to 10.0% by mass, preferably 2.0% by mass to 5.0% by mass is passed through the column. Although the silica concentration of the alkali silicate aqueous solution to be ion-exchanged may be selected from a range of 0.1% by mass to 10.0% by mass, a range by which the stability of the obtained active silicic acid solution is advantageous is a range of a silica concentration of 0.1% by mass or more, preferably 2.0% by mass or more, more preferably 3.0% by mass or more, and preferably 5.0% by mass or less.

The filter used in the present invention is a filter whose removal rate of particles having a primary particle size of 1.0 μm is 50% or more. The removal rate is preferably 60% by mass or more, more preferably 70% by mass or more, further preferably 80% by mass or more, the most preferably 90% by mass or more. Here, the removal rate of particles having a primary particle size of 1.0 μm or more is calculated from the number of mono-dispersed polystyrene latex particles having a diameter of 1.0 μm before and after the filtration of an aqueous dispersion of the polystyrene latex particle. As the mono-dispersed polystyrene latex particle having a diameter of 1.0 μm, there can be used, for example, STAN-DEX-SC-103-S (manufactured by JSR Corporation), the standard particle 4009A (manufactured by Thermo Fisher Scientific Inc.), and the like.

The material for the filter used in the present invention is at least one type selected from the group consisting of polyester, polyethylene, polypropylene, polytetrafluoroethylene, polyethylene terephthalate, cellulose acetate, a cellulose/epoxy resin, a glass fiber/acryl resin, a cotton, polysulfon, nylon, polyethersulfon, and polycarbonate, and these materials are used individually or are compounded or superimposed on each other to be used.

In addition, when the filter is produced from these materials, a filter in which a filtering assistant such as a diatomaceous earth, silica/alumina, and a mixture of zeolite with silica/alumina is incorporated can be used. The filter in which the filtering assistant is incorporated not only is effective for removal of colloidal suspending substances, but also has an effect of adsorbing an organic aliphatic acid and polyphenols which are a substance causing sediment, and can efficiently trap sub-micron fine particles.

The filter used in the present invention is classified, depending on its production method, into a membrane-type filter (porous membrane filter), a pleats-type filter (filter subjected to pleats processing), a depth filter (filter trapping solid particles not only in the surface of the filtering material, but also in the inside of the filtering material), a roll-type filter (filter wound in a roll), a yarn-wound filter (filter in a spool shape), a surface-type filter (filter of a type of trapping particle-shaped substances not in the filter inside, but mainly in the face in the filter primary side), a diatomaceous-earth-containing-type filter (filter using a filtering material in which a diatomaceous earth is blended), a depth-pleats-type filter (filter trapping solid particles not only in the surface of the filtering material, but also in the inside of the filtering material which is subjected to pleats processing), and the like. Although the method for producing a filter used in the present invention is not particularly limited and any one of the above methods may be adopted, among them, the membrane-type filter is effective for precise filtration and particularly, a membrane-type filter having an absolute pore size of 0.3 μm to 3.0 μm can extremely effectively remove plate-like fine particles having a length of one side of 0.2 to 4.0 μm and a thickness of 1 to 100 nm.

With respect to these filters, in order to extend the usable time, a filter whose removal rate of particles having a primary particle size of 1.0 μm is less than 50% may be used as a pre-treatment filter and next, the filtration may be performed by a filter whose removal rate of particles having a primary particle size of 1.0 μm is 50% or more.

The temperature at which the active silicic acid solution is filtered using a filter whose removal rate of particles having a primary particle size of 1.0 μm is 50% or more may be normal temperature and is usually 0° C. or more and 50° C. or less.

Although the filtering rate at which the active silicic acid solution is filtered using a filter whose removal rate of particles having a primary particle size of 1.0 μm is 50% or more is varied depending on the silica concentration and the viscosity of the active silicic acid solution and the used filter, it is 13 L/min to 400 L/min per 1 $m^2$ of the filtration area of the used filter.

The measuring method A of plate-like fine particles having a length of one side of 0.2 to 4.0 μm and a thickness of 1 to 100 nm contained in the active silicic acid solution purified by being filtered by a filter whose removal rate of particles having a primary particle size of 1.0 μm is 50% or more, is as follows.

Measuring Method A

When a membrane-type filter (filtration area: 4.90 $cm^2$) having an absolute pore size of 0.4 μm through which 30 mL of a solution to be observed having a silica concentration of 4% by mass and a temperature of 25° C. is passed, is observed under a scanning electron microscope by being magnified by 5,000 times, a state in which one or more of the plate-like fine particles exist within one visual field as an observation area of a rectangle having a length of 15 μm and a width of 20 μm is measured as one count, and the presence or absence of the count is determined with respect to all of 100 visual fields having visual field areas that do not overlap with each other to measure the obtained total number of counts as the existing amount (%) of the plate-like fine particles. As the membrane-type filter, for example, that made of polycarbonate can be used and, for example, that having a filtration area of 4.90 $cm^2$ and a diameter of 25 mm can be used. For example, Isopore HTTP-02500 (manufactured by Nihon Millipore K.K.) can be used.

In this case, the solution to be observed is an active silicic acid solution filtered by a filter whose removal rate of particles having a primary particle size of 1.0 μm is 50% or more.

By filtering the active silicic acid solution by the method of the present invention, a purified active silicic acid solution can be obtained in which the existing amount of plate-like fine particles having a length of one side of 0.2 to 4.0 μm and a thickness of 1 to 100 nm is measured to be 0% to 30% by the measuring method A.

The present invention is also a method for producing a silica sol fulfilling the condition (2):

(2) the existing amount of plate-like fine particles having a length of one side of 0.2 to 4.0 μm and a thickness of 1 to 100 nm is measured to be 0% to 30% in accordance with the measuring method A; in this case, the solution to be observed is a silica sol, characterized by polymerizing a purified active silicic acid solution in which the existing amount of plate-like fine particles having a length of one side of 0.2 to 4.0 μm and a thickness of 1 to 100 nm is measured to be 0% to 30% by the measuring method A and which is obtained by being filtered by a filter whose removal rate of particles having a primary particle size of 1.0 μm is 50% or more, in an alkaline aqueous solution.

The active silicic acid solution obtained by the method of the present invention is added into an alkaline aqueous solution to obtain a mixture and the mixture is heated to polymerize active silicic acid. By polymerizing the active silicic acid, colloidal silica particles are generated to obtain a silica sol. The silica concentration of the active silicic acid solution added to the alkaline aqueous solution is in a range of 0.1% by mass to 10.0% by mass, and is 0.1% by mass or more, preferably 2.0% by mass or more, more preferably 3.0% by mass, and preferably 5.0% mass or less.

The alkaline components of the alkaline aqueous solution are at least one type selected from the group consisting of an alkali metal ion, an ammonium ion, amine, and a quaternary ammonium ion.

Examples of the alkali metal ion include a sodium ion, a potassium ion, a lithium ion, a rubidium ion, and a cesium ion and among them, preferred are a sodium ion and a potassium ion.

As the amine, a water-soluble amine is preferred and examples thereof include monoethanolamine, diethanolamine, triethanolamine, N,N-dimethylethanolamine, N-(β-aminomethyl)ethanolamine, N-methylethanolamine, monopropanolamine, and morpholine.

Examples of the quaternary ammonium ion include a tetraethanolammonium ion, a monomethyltriethanolammonium ion, and a tetramethylammonium ion.

An appropriate amount ratio between the added active silicic acid solution and the alkaline aqueous solution can be expressed with a ratio of the number of moles of silica in the total amount of the added active silicic acid solution to the number of moles of the alkaline components in the alkaline aqueous solution, and the ratio of number of silica moles/number of alkaline component moles is preferably in a range of 25 to 100.

The temperature of the alkaline aqueous solution when the active silicic acid is polymerized can be selected from a range of 20° C. to 300° C. When the temperature during the polymerization is low, the particle size of the obtained colloidal silica particle is small and when the temperature is high, the particle size of the obtained colloidal silica particle is large. Although the particle size of the obtained colloidal silica particle is varied depending on the polymerization condition of active silicic acid, it is, as the primary particle size observed under a scanning electron microscope, in a range of 3 nm to 1,000 nm.

A diluted silica sol containing colloidal silica particles which is obtained by the polymerization of active silicic acid can be concentrated by a conventionally known method such as an evaporation concentration method and a ultrafiltration method. The concentration of the silica sol can be usually performed to the silica concentration of around 50% by mass.

EXAMPLES

[Measuring method of removal rate of particles having primary particle size of 1.0 μm]

With respect to the used filter, the removal rate of particles having a primary particle size of 1.0 μm was measured by the method below. An aqueous dispersion in which 0.5 mL of mono-dispersed polystyrene latex particles (manufactured by JSR Corporation; STADEX SC-103-S) having a diameter of 1.0 μm are dispersed in 5,000 mL of pure water was prepared and using a sensor of particles in a liquid KS-42C (manufactured by RION Co., Ltd.), the number (a) of particles having a primary particle size of 1.0 μm was measured. The number (b) of particles in the pure water used for the aqueous dispersion was measured as Blank 1. The aqueous dispersion was filtered by the used filter and the number (c) of particles having a primary particle size of 1.0 μm in the aqueous dispersion after the filtration was measured. By the used filter, only the pure water was filtered beforehand and the number (d) of particles in the filtered pure water was measured as Blank 2. The removal rate of particles having a primary particle size of 1.0 μm by the used filter was calculated according to the equation (I):

Removal rate (%)=[1−[(c−d)/(a−b)]]×100　　　Equation (I)

[Measuring Method A]

When a polycarbonate membrane-type filter (manufactured by Nihon Millipore K.K.; Isopore HTTP-02500; filtration area: 4.90 cm$^2$; diameter: 25 mm) having an absolute pore size of 0.4 μm through which 30 mL of a solution to be observed having a silica concentration of 4% by mass and a temperature of 25° C. is passed, is observed under a scanning electron microscope by being magnified by 5,000 times, a state in which one or more of the plate-like fine particles having a length of one side of 0.2 to 4.0 μm and a thickness of 1 to 100 nm exist within one visual field as an observation area of a rectangle having a length of 15 μm and a width of 20 μm is measured as one count, and the presence or absence of the count is determined with respect to all of 100 visual fields having visual field areas that do not overlap with each other to measure the obtained total number of counts as the existing amount (%) of the plate-like fine particles.

Example 1

To 1,000 g of a commercially available sodium silicate aqueous solution (JIS No. 3, SiO$_2$: 29.3% by mass, Na$_2$O: 9.5% by mass), 6,325 g of pure water was added to dilute the sodium silicate aqueous solution. The diluted sodium silicate aqueous solution had such physical properties as SiO$_2$: 4.0% by mass, Na$_2$O: 1.3% by mass, and specific gravity: 1.038. This sodium silicate aqueous solution was passed through an ion-exchange tower filled with 500 mL of a cation-exchange resin (Amberlite (registered trade mark) 120B: manufactured by the Dow Chemical Corporation) at a rate of 2,500 g/hour to obtain about 7,200 g of the active silicic acid solution. The existing amount of plate-like fine particles having a length of one side of 0.2 to 4.0 µm and a thickness of 1 to 100 nm observed under a scanning electron microscope was 73% when the obtained active silicic acid solution was measured under the measuring conditions A. This active silicic acid solution was filtered using one piece of a polypropylene nonwoven pleats-type filter (manufactured by Roki Techno Co., Ltd., PEH-005; removal rate of particles having primary particle size of 1.0 µm 99.9%; filtration area: 0.2 m²; filter total length: 250 mm) having a nominal pore size of 0.5 µm which was produced by mixing a glass fiber and a diatomaceous earth at a flow rate of 3 L/min. As a result of measuring the active silicic acid solution after the filtration by the measuring method A, the existing amount of the plate-like fine particles was 1%.

Example 2

In the same manner as in Example 1, except that as the filter used for the filtration, one piece of a polypropylene nonwoven depth-type filter (manufactured by Roki Techno Co., Ltd., SL-005; removal rate of particles having primary particle size of 1.0 µm: 90%; filtration area: 0.3 m²; filter total length: 250 mm) was used and the flow rate was set at 3 L/min, about 7,200 g of an active silicic acid solution having $SiO_2$: 4.0% by mass was filtered. As a result of measuring the active silicic acid solution after the filtration by the measuring method A, the existing amount of the plate-like fine particles was 17%.

Example 3

To 1,000 g of a commercially available sodium silicate aqueous solution (JIS No. 3, $SiO_2$: 29.3% by mass, $Na_2O$: 9.5% by mass), 6,325 g of pure water was added to dilute the sodium silicate aqueous solution. The diluted sodium silicate aqueous solution had such physical properties as $SiO_2$: 4.0% by mass, $Na_2O$: 1.3% by mass, and specific gravity: 1.038. This sodium silicate aqueous solution was passed through an ion-exchange tower filled with 500 mL of a cation-exchange resin (Amberlite (registered trade mark) 120B: manufactured by the Dow Chemical Corporation) at a rate of 2,500 g/hour to obtain about 7,200 g of the active silicic acid solution. The existing amount of plate-like fine particles having a length of one side of 0.2 µm to 4.0 µm and a thickness of 1 nm to 100 nm observed under a scanning electron microscope was 75% when the obtained active silicic acid solution was measured under the measuring conditions A. This active silicic acid solution was filtered using one piece of a polyethersulfon membrane-type filter (manufactured by Roki Techno Co., Ltd., CES-005; removal rate of particles having primary particle size of 1.0 µm: 100%; filtration area: 0.75 m²; filter total length: 250 mm) having an absolute pore size of 0.45 µm at a flow rate of 3 L/min. As a result of measuring the active silicic acid solution after the filtration by the measuring method A, the existing amount of the plate-like fine particles was 4%.

Example 4

Into a glass separable flask having a volume of 3 L, 4.55 g of a 32% by mass NaOH aqueous solution and 379 g of pure water were charged and while stirring the NaOH aqueous solution, the NaOH aqueous solution was heated to 85° C. To the heated NaOH aqueous solution, 723 g of the active silicic acid solution obtained in Example 1 after the filtration was added at a rate of 430 g/min and the temperature of the resultant reaction mixture was elevated to 100° C., followed by further adding 1879 g of the active silicic acid solution obtained in Example 1 after the filtration to the reaction mixture at a rate of 430 g/min. After the completion of adding, while maintaining the temperature of the reaction mixture at 100° C., the reaction mixture was continued to be stirred for 6 hours. After the stop of heating, the reaction mixture was cooled down and was concentrated by an ultrafiltration membrane having a cutoff molecular weight of 50,000 to obtain a silica sol. This silica sol had such physical properties as specific gravity: 1.212, pH: 10.0, viscosity: 3.0, silica concentration: 30.6% by weight, and primary particle size measured by observation under a transmission electron microscope: 10 nm to 40 nm. The obtained silica sol was measured by the measuring method A and the existing amount of the plate-like fine particles was 1%.

Comparative Example 1

To 1,000 g of a commercially available sodium silicate aqueous solution (JIS No. 3, $SiO_2$: 29.3% by mass, $Na_2O$: 9.5% by mass), 6,325 g of pure water was added to dilute the sodium silicate aqueous solution. The diluted sodium silicate aqueous solution had such physical properties as $SiO_2$: 4.0% by mass, $Na_2O$: 1.3% by mass, and specific gravity: 1.038. 4,000 g of the obtained sodium silicate aqueous solution was passed through an ion-exchange tower filled with 500 mL of a cation-exchange resin (Amberlite (registered trade mark) 120B: manufactured by the Dow Chemical Corporation) at a rate of 2,500 g/hour to obtain the active silicic acid solution. The obtained active silicic acid solution had specific gravity: 1.020, pH: 2.88, and $SiO_2$: 3.55% by mass and was a colorless transparent solution. The existing amount of the plate-like fine particles contained in this active silicic acid solution was 78% when measured by the measuring method A. By the method described in Example 4 except that this active silicic acid solution was used, a silica sol was produced. The silica sol had such physical properties as specific gravity: 1.212, pH: 9.9, viscosity: 4.6, silica concentration: 30.5% by weight, and primary particle size measured by observation under a transmission electron microscope: 10 nm to 40 nm. The obtained silica sol was measured by the measuring method A and the existing amount of the plate-like fine particles was 80%.

Comparative Example 2

In the same manner as in Example 1, except that as the filter used for the filtration of the active silicic acid solution, one piece of a polypropylene nonwoven depth-type filter (manufactured by Roki Techno Co., Ltd., SL-200; removal rate of particles having primary particle size of 1.0 µm: 20%; filtration area: 0.3 m²; filter total length: 250 mm) having a nominal pore size of 20 µm was used, the filtration was performed. As a result of measuring the active silicic acid solution after the filtration by the measuring method A, the existing amount of the plate-like fine particles was 70%. By the method described in Example 4 except that this active silicic acid solution was used, a silica sol was produced. The silica sol had such physical properties as specific gravity: 1.211, pH: 10.0, viscosity: 4.0, silica concentration: 30.4% by weight, and primary particle size measured by observation under a transmission electron microscope: 10 nm to 40 nm. The obtained silica sol was measured by the measuring method A and the existing amount of the plate-like fine particles was 75%.

Comparative Example 3

The active silicic acid solution obtained in the same manner as in Example 1 was filtered using a polysulfon ultrafiltration membrane (filtration area: 45 cm$^2$, diameter: 76 mm) having a cutoff molecular weight of 10,000. The average flow rate during the initial 5 minutes of the filtration was 0.5 L/min per 1 m$^2$ of the filtration area. The filtering rate after 100 minutes from the initiation of the filtration lowered to 0.2 L/min per 1 m$^2$.

INDUSTRIAL APPLICABILITY

The silica sol produced from the active silicic acid solution obtained by the present invention as a raw material contains a small amount of plate-like fine particles, so that fine foreign matters do not remain in the surface processing of a base material such as a metal, an alloy, and a glass, a defect due to foreign matters such as wiring failure and surface roughness is prevented, and the silica sol can be utilized in the production of a substrate having high surface precision.

The invention claimed is:

1. A method for producing a purified active silicic acid solution, the method comprising:
    preparing an active silicic acid solution by subjecting an alkali silicate aqueous solution having a silica concentration of 0.5% by mass to 10.0% by mass to cation-exchange to remove alkaline components wherein the active silicic acid solution that is prepared contains an amount of plate-like fine particles having a length of one side of 0.2 to 4.0 µm and a thickness of 1 to 100 nm; and
    filtering the active silicic acid solution through a filter selected from the group consisting of a membrane filter, a pleated filter, a depth filter, a yarn-wound filter, a surface filter, a roll filter, a pleated depth filter, a diatomaceous-earth-containing filter, and combinations thereof, the filter having:
        a removal rate of particles having a primary particle size of 1.0 µm of 50% or more, and
        a filtering rate in a range of from 13 L/min to 400 L/min per 1 m$^2$ of a filtration area of the filter;
    wherein:
    an amount of plate-like fine particles having a length of one side of 0.2 to 4.0 µm and a thickness of 1 to 100 nm in the purified active silicic acid solution is in a range of from 0% to 30% as measured by a measuring method A;
    the measuring method A comprises:
        observing under a scanning electron microscope at a magnification of 5,000 times a membrane filter through which 30 mL of a solution to be observed has been passed, the solution to be observed having a silica concentration of 4% by mass and a temperature of 25° C., and the membrane filter having a filtration area of 4.90 cm$^2$ and an absolute pore size of 0.4 µm;
        measuring as one count a state in which one or more of the plate-like fine particles exist within one visual field area having a length of 15 µm and a width of 20 µm; and
        determining the presence or absence of the count with respect to each visual field area of 100 non-overlapping visual field areas to measure a total number of counts as the amount (%) of the plate-like fine particles; and
    the solution to be observed in the measuring method A is the purified active silicic acid solution.

2. The method according to claim 1, wherein the removal rate is 60% or more.

3. The method according to claim 1, wherein the removal rate is 70% or more.

4. The method according to claim 1, wherein the removal rate is 80% or more.

5. The method according to claim 1, wherein the removal rate is 90% or more.

6. The method according to claim 1, wherein the filter is a membrane filter having an absolute pore size of 0.3 µm to 3.0 µm.

7. The method according to claim 1, wherein the alkaline components of the alkali silicate aqueous solution are at least one selected from the group consisting of a sodium ion, a potassium ion, a lithium ion, a rubidium ion, and a cesium ion.

8. A method for producing a silica sol, the method comprising:
    adding the purified active silicic acid solution produced by the method according to claim 1 into an alkaline aqueous solution to obtain a mixture; and
    heating the mixture to polymerize active silicic acid;
    wherein an amount of plate-like fine particles having a length of one side of 0.2 to 4.0 µm and a thickness of 1 to 100 nm in the silica sol is in a range of from 0% to 30% as measured by the measuring method A in which the solution to be observed is the silica sol.

9. The method according to claim 8, wherein the alkaline components of the alkaline aqueous solution are at least one selected from the group consisting of an alkali metal ion, an ammonium ion, amine, and a quaternary ammonium ion.

10. The method according to claim 1, wherein
    the amount as measured by the measuring method A of the plate-like fine particles in the purified active silicic acid solution is reduced relative to an amount as measured by the measuring method A of the plate-like fine particles contained in the active silicic acid solution.

11. The method according to claim 1, wherein the alkali silicate aqueous solution has a silica concentration in a range of from 0.5% by mass to 4% by mass.

12. The method according to claim 1, wherein the filter is selected from the group consisting of a pleated filter, a depth filter, a yarn-wound filter, a surface filter, a roll filter, a pleated depth filter, a diatomaceous-earth-containing filter, and combinations thereof.

13. The method according to claim 1, wherein the active silicic acid solution contains an amount of the plate-like fine particles as measured by the measuring method A in a range of from 73% to 75%.

* * * * *